United States Patent
Drennan

[15] 3,638,635
[45] Feb. 1, 1972

[54] SPLIT GAS BURNER
[72] Inventor: Wendell M. Drennan, Evansville, Ind.
[73] Assignee: Arkla Industries, Inc., Evansville, Ind.
[22] Filed: Sept. 18, 1969
[21] Appl. No.: 859,156

[52] U.S. Cl. ................................126/41 R, 239/444, 431/278
[51] Int. Cl. .....................................A47j 37/07, F23d 13/00
[58] Field of Search......................126/41; 431/278; 239/444

[56] References Cited

UNITED STATES PATENTS

| 973,498 | 10/1910 | Geurink | 431/278 |
| 1,224,157 | 5/1917 | Fry | 431/278 X |
| 1,328,589 | 1/1920 | Roberts | 431/278 |
| 2,790,434 | 4/1957 | Del Francia | 126/41 |
| 3,295,509 | 1/1967 | Harvey | 126/41 UX |
| 3,386,432 | 6/1968 | Hanson | 126/41 |
| 3,498,284 | 3/1970 | Swaddey | 126/41 |

Primary Examiner—Charles J. Myhre
Attorney—Cushman, Darby & Cushman

[57] ABSTRACT

A gas-fired cooking grill includes a cooking and smoke-retaining enclosure and a gas burner within the enclosure, the burner being an integral cast hollow structure having two distinct, independently controlled burner portions serving different parts of the cooking rack.

8 Claims, 3 Drawing Figures

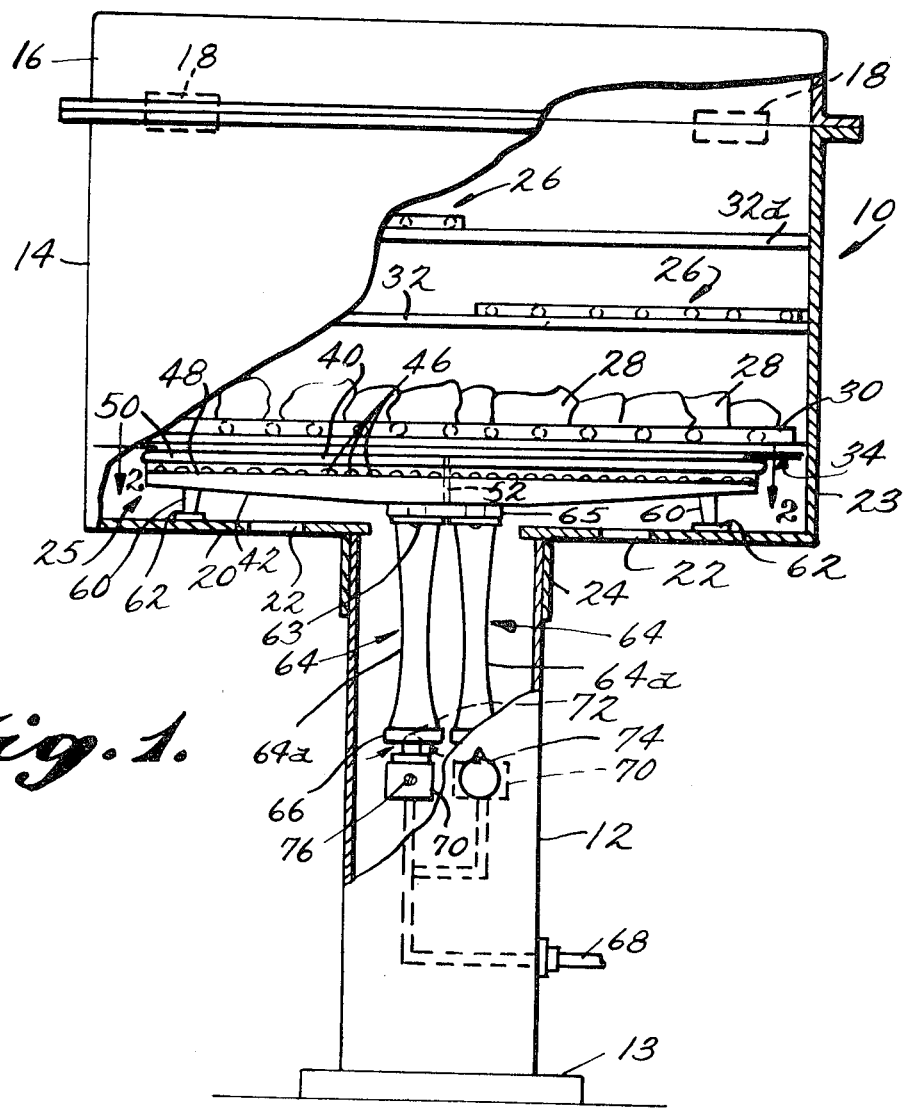

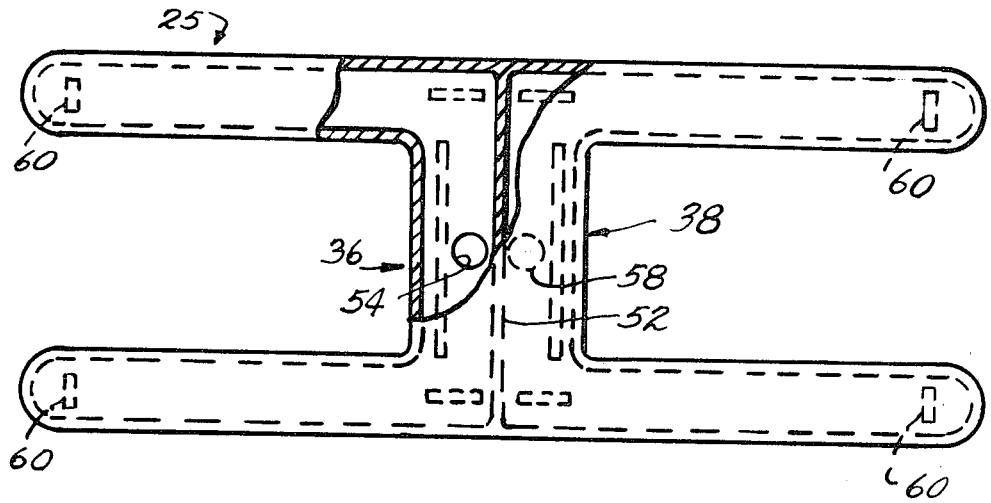
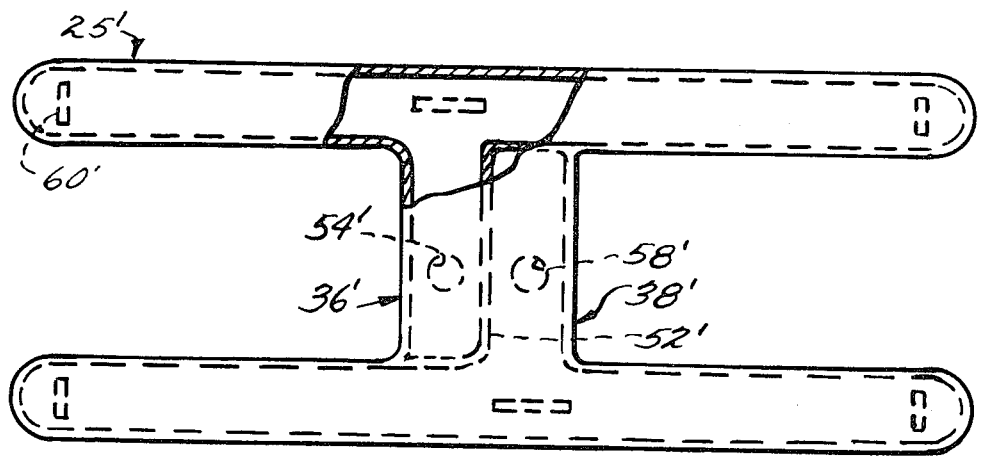

SPLIT GAS BURNER

This invention relates to gas-fired cooking grills and in particular to an improved gas burner for such grills.

Gas-fired cooking grills of contemporary construction generally include an open-topped boxlike enclosure in which are disposed a horizontal cooking rack, a layer of loosely-packed ceramic briquets supported below the cooking rack and a gas burner located below the layer of briquets. Usually the enclosure is provided with a removable or hinged top so that smoke will be retained in the enclosure, the smoke being generated during use by the vaporization and combustion of fat and meat juices dripping on to the heated briquets. Heat reaches the food on the cooking rack in the form of radiant heat from the briquets and in the form of hot gases rising through the layer of briquets from the gas flame.

In conventional gas-fired grills the gas burner is so shaped and arranged that heat is supplied substantially uniformly over the whole horizontal cross-sectional area of the enclosure. This arrangement has in the past been deemed desirable, because each piece of food on the grill, or all portions of a large piece, will receive about the same amount of heat, whereby it is unnecessary to shift the position of the pieces or piece during cooking.

It has been observed, however, that in grills of substantial size there is a need to adapt part of the cooking area to operate in a different manner from another part, either in terms of temperature or in terms of a difference in the type of heat energy. For example, if one part of the bed of briquettes is heated by the gas flame and one part is not so heated, then food placed over the unheated briquettes will be cooked primarily by radiant heat, whereas food placed over the directly heated briquettes will be cooked by direct heat including the hot gases from the burner flame. Greasy meat, which may tend to cause flareups if cooked over direct heat, can be cooked by radiant or indirect heat with a much reduced tendency to flare up.

Temperature control of different parts of the cooking area is desirable, for example, when several steaks are being prepared simultaneously and it is desired to cook one to a greater degree than another. This can be accomplished most simply if one part of the cooking rack, say one-half, is maintained at high temperature and the other part is maintained at a lower temperature. Also, when a plurality of different sized pieces of meat, such as chicken pieces, pork chops or spare ribs, are being cooked, it is much easier to avoid overcooking the smaller or thinner pieces if part of the cooking rack is at a lower temperature than the remainder of the rack.

The present invention provides a simply constructed gas burner which is internally partitioned, or split into at least two distinct sections so that each section can be operated independently of the other section. The burner, when properly arranged below the briquettes in a cooking grill and provided with appropriate independent gas control means, permits the operator to adjust the temperature of the different parts of the cooking rack for the various purposes described above.

The invention will be further understood from the following detailed description of two exemplary embodiments taken with the drawing in which:

FIG. 1 is a front elevational view, partly broken away, of a gas-fired cooking grill embodying the improved gas burner;

FIG. 2 is a plan view of the gas burner of FIG. 1 looking in the direction of arrows 2—2; and FIG. 3 is a plan view of a modification of the burner of FIG. 2.

Referring to FIG. 1 there is shown a gas-fired cooking grill which includes a typical cooking enclosure 10 mounted on a post 12 which in turn is supported on a base 13. The cooking enclosure 10 is a boxlike structure having a one-piece cast metal bottom section 14 and a one-piece cast metal top section 16 which is hinged to the rear wall of the bottom section 14 as at 18. The floor 20 of bottom section 14 may be provided with apertures 22 which admit secondary combustion air during operation. An aperture 23 in one end wall permits entry of a lighted match. The bottom section 14 rests directly on the upper end of the post 12, the latter being loosely telescoped into a downwardly projecting sleeve 24 which is secured to the lower surface of the floor 20.

Within the bottom section 14 of the enclosure 10 is a gas burner 25, which embodies the principles of the present invention, together with the usual cooking rack 26 and layer of ceramic briquettes 28, the latter being supported on a grate 30 which may be similar in construction to the cooking rack 26. The rack 26 and the grate 30 are removably supported in any suitable manner as by resting on lips 32 and 34 which extend inwardly from the front and rear walls of the bottom section 14. As shown, the cooking rack 26 is in two parts which may be supported on either the lip 32 or a higher lip 32a.

All of the above, with the exception of the construction of the burner 25, are more or less conventional in gas grills being manufactured at the present time. The burner 25, according to the present invention, is a unitary hollow metal structure defining at least two arms which extend horizontally under different parts of the cooking rack 26, each of the arms receiving gas from a separate, adjustable gas delivery means so that the operator of the grill can adjust the temperature of the different parts of the cooking rack.

In the embodiment of FIGS. 1 and 2 the burner 25 is H-shaped in overall plan view and is constructed internally to define two arms 36 and 38 each of which is generally U-shaped. The arm 36 is disposed below the left part of the cooking rack 26, and the arm 38 is disposed below the right part of the cooking rack 26. While an H-shape is usually preferred from the standpoint of ease of construction and operation, other shapes such as X-shapes or Z-shapes may be employed.

Preferably the burner 25 is constructed as a one-piece integrally cast structure by a suitable one-step casting technique which provides for both the hollow interior and a continuous row of gas apertures 46 around the whole periphery of the structure. Conveniently the mold will have two parts, one of which defines the contour of the upper half of the burner 25 and the other of which defines the contour of the lower half. The row of apertures 46 follows the mold separation line 48 seen in FIG. 1. Also as seen in FIG. 1, the upper portion of the burner 25 includes a laterally projecting lip 50 which extends along the entire periphery of the structure. A vertically disposed integral internal partition 52 extends the length of the bar of the H to separate the arms 36 and 38.

In the bottom wall of the burner are cast two spaced-apart gas inlet openings 54 and 58 which are disposed on opposite sides of the partition 52. Projecting downwardly from the bottom burner wall at each corner is an integral foot 60 which rests on the upper surface of the bottom wall 20 of the enclosure 10 thereby supporting the burner 25. Positioning flanges 62 on the wall 20 are provided for preventing the burner 25 from slipping laterally after it has been lowered into position.

A separate gas delivery means is associated with each of the arms 36 and 38. As shown, each delivery means includes a vertically disposed venturi delivery tube 64 having a flanged upper end connected as by screws 63 to a boss 65 on the bottom of the burner 25 so as to be in communication with one of the openings 54 or 58. The lower end of the tube 64 is in communication with a venturi mixer 66. The latter, which may be of conventional construction, is a device for receiving gas from a supply and mixing it with primary combustion air which is drawn into the device by the flow of the gas through a venturi throat 64a. As shown, the gas supply includes a gas supply tube 68, an adjustable valve 70 and a nozzle fitting 72 which injects gas into the mixer 66. Each of the two valves 70 is manually controlled by means of a rotatable knob 74 mounted outside the post 12 on the outer end of a valve control shaft 76. Each assembly of valve 70 and fitting 72 is supported in a fixed position by any suitable means and does not receive the weight of the burner 25 and associated mixer tubes 54 inasmuch as the latter are supported by the feet 60.

A modified H-shaped burner 25' is illustrated in FIG. 3, this burner being substantially identical with the burner 25 except that the integral internal partition 52' is located somewhat differently. In the modified burner 25 the burner of each arm 36' and 38' is coextensive with and parallel to the other arm and constitutes an entire leg of the H-shape. Therefore, in operation the burner 25' permits adjustment of the front and rear portions of the cooking rack to different temperatures.

To place the gas grill of FIG. 1 in operation the user inserts a lighted match through the opening 23 and turns on the gas supply to the burner arm 38 by means of the corresponding valve-control knob 74. The other burner arm 36 is placed in operation, when desired, by turning on the gas supply to that arm, the flame from the arm 38 serving to light the gas automatically.

In one mode of operation only one burner arm, say the arm 38, is lighted. Under these conditions that portion of the cooking rack 26 which overlies the unlighted burner arm 36 receives heat energy primarily in the form of radiant heat, and the other portion of the cooking rack 26 receives direct heat from the heated briquettes 28 and from the flame and hot gases. Flareups often encountered when grilling greasy meats can be avoided by cooking such meats in the radiantly heated zone, because the grease dripping from the meat will pass through the relatively unheated briquettes to the floor 20 of the grill where it may be drained off through a suitable aperture. As is known, a flareup is the ignition and rapid burning of grease which sometimes results from contact of the grease with highly heated briquettes and/or with the open gas flame.

In a second mode of operation both burner arms 38 and 36 are lighted and adjusted to different heat outputs. By adjusting one burner arm to high heat and the other to low heat the user can, for example, cook one steak to a well done condition and another to a rare condition within about the same period of time. If he is cooking chops or other pieces which are apt to be of various sizes or thicknesses, he can cook the larger or thicker pieces over high heat and the smaller or thinner pieces over low heat, and if necessary, he can shift the pieces from one end of the rack to the other, in order to achieve uniform cooking.

The elevations of the two parts of the cooking rack 26 can also be shifted as a further aid in cooking flexibility. The halves of the rack will usually be positioned before the burner 25 is lit, this being accomplished in the case of the lower position by tilting the rack piece from front to back in order to lower it past the upper lips 32a.

The operation of the grill when provided with the burner 25' of FIG. 3 is the same as described above, except that adjustment of the two gas delivery means controls the temperatures at the front and rear of the cooking rack 32.

What is claimed is:

1. In a gas-fired cooking grill: walls defining a cooking and smoke-retaining enclosure; a horizontal cooking rack disposed in said enclosure; a gas burner disposed below said coking rack, said burner being a unitary hollow metal structure defining at least two hollow arms which are provided with gas flame apertures and which extend horizontally under different halves of said rack, said hollow metal structure having at least one internal partition separating the interiors of said arms from each other; and separate adjustable gas-delivery means cooperating with each of said arms whereby the operator of the grill may adjust the temperature of said different parts of said cooking rack.

2. A gas-fired cooking grill as in claim 1 wherein said burner has two arms, one of said arms extending under approximately one-half of said cooking rack and the other of said arms extending under the other half of said cooking rack.

3. A gas-fired cooking grill as in claim 2 wherein said gas burner is H-shaped and wherein said internal partition divides the interior of said burner into two generally U-shaped arms.

4. A gas-fired cooking grill as in claim 2 wherein said gas burner is generally H-shaped and wherein said internal partition divides the interior of said burner into two generally straight parallel arms.

5. A gas-fired cooking grill as in claim 2 wherein said hollow metal structure is a one-piece integrally cast structure.

6. A cooking grill as in claim 2 wherein said burner has two downwardly facing gas inlet apertures disposed on opposite sides of said internal partition and wherein each gas-delivery means includes a vertically disposed, venturi mixer tube having an upper end secured to said burner and cooperating with one of said gas inlet apertures and a lower end disposed adjacent a fixed gas discharge fitting so as to receive gas therefrom, said grill further including means supporting said burner and said mixer tubes on said enclosure whereby the weight of said burner and said mixer tubes does not rest on said gas discharge fitting.

7. A gas burner for use in an environment where it is desired to provide two zones of different temperatures, said burner comprising an integrally cast hollow metal structure having a plurality of horizontal arms extending outwardly from a common chamber, said arms being provided with gas flame apertures over substantially their entire periphery, and a vertically disposed integrally cast internal partition within said chamber separating the interior of the hollow structure into two generally equal portions, said chamber having a bottom wall provided with two downwardly facing gas inlet apertures disposed on opposite sides of said partition, and an integrally cast foot depending from the bottom wall of each arm near the free end thereof for cooperating with a fixed support structure.

8. A gas burner as in claim 7 in combination with a cooking grill having a horizontal cooking rack, sidewalls surrounding said burner and said rack, and a bottom wall on which said burner feet rest.

* * * * *